(12) United States Patent
Lamers

(10) Patent No.: US 11,148,079 B2
(45) Date of Patent: Oct. 19, 2021

(54) LIQUID TREATMENT DEVICE

(71) Applicant: SPIRO ENTERPRISES B.V., Em Sint Anthonis (NL)

(72) Inventor: Antonius Gerardus Wilhelmus Maria Lamers, JJ Asten (NL)

(73) Assignee: SPIRO ENTERPRISES B.V., Em Sint Anthonis (NL)

( * ) Notice: Subject to any disclaimer, the term of this patent is extended or adjusted under 35 U.S.C. 154(b) by 297 days.

(21) Appl. No.: 16/319,458

(22) PCT Filed: Jul. 21, 2017

(86) PCT No.: PCT/NL2017/050496
§ 371 (c)(1),
(2) Date: Jan. 21, 2019

(87) PCT Pub. No.: WO2018/016959
PCT Pub. Date: Jan. 25, 2018

(65) Prior Publication Data
US 2020/0086247 A1 Mar. 19, 2020

(30) Foreign Application Priority Data

Jul. 22, 2016 (NL) .................................... 2017218

(51) Int. Cl.
*B01D 35/06* (2006.01)
*B01D 21/30* (2006.01)
(Continued)

(52) U.S. Cl.
CPC ............. *B01D 35/06* (2013.01); *B01D 21/30* (2013.01); *B01D 29/035* (2013.01); *B01D 29/11* (2013.01);
(Continued)

(58) Field of Classification Search
CPC ...... B01D 35/06; B01D 21/30; B01D 29/035; B01D 29/11; B01D 29/6484; B01D 29/66;
(Continued)

(56) References Cited

U.S. PATENT DOCUMENTS 3,618,781 A 11/1971 Brown
8,968,438 B2 * 3/2015 Cortez .................. B01J 19/088
55/337
2009/0045104 A1 2/2009 Ricardo et al.

FOREIGN PATENT DOCUMENTS

| CA | 2536575 A1 | 3/2005 |
|----|------------|--------|
| DE | 1077637 B  | 3/1960 |

(Continued)

OTHER PUBLICATIONS

International Search Report and Written Opinion for the International Patent Application No. PCT/NL2017/050496, dated Sep. 21, 2017, 10 pages.

(Continued)

*Primary Examiner* — Waqaas Ali
(74) *Attorney, Agent, or Firm* — Kacvinsky Daisak Bluni PLLC

(57) ABSTRACT

A liquid treatment device is configured to perform at least one treatment from a group of at least two different treatments. The liquid treatment device includes a connector defining an input conduit and an output conduit, a housing defining a closed-off space, and an adapter inside the housing. The adapter is moveable in the housing between at least a first position corresponding with a first liquid treatment and a second position corresponding with a second liquid treatment. A control is disposed outside the housing and connected to the adapter, and is configured to set the adapter (Continued)

from outside of the housing into one of at least the first position and the second position.

20 Claims, 7 Drawing Sheets

(51) Int. Cl.
  | | |
  |---|---|
  | *B01D 29/03* | (2006.01) |
  | *B01D 29/11* | (2006.01) |
  | *B01D 29/64* | (2006.01) |
  | *B01D 29/66* | (2006.01) |
  | *B01D 29/90* | (2006.01) |
  | *B01D 35/12* | (2006.01) |
  | *B01D 35/143* | (2006.01) |
  | *B03C 1/033* | (2006.01) |
  | *B03C 1/28* | (2006.01) |
  | *C02F 1/00* | (2006.01) |

(52) U.S. Cl.
  CPC ......... *B01D 29/6484* (2013.01); *B01D 29/66* (2013.01); *B01D 29/908* (2013.01); *B01D 35/12* (2013.01); *B01D 35/143* (2013.01); *B03C 1/0332* (2013.01); *B03C 1/288* (2013.01); *C02F 1/001* (2013.01); *B03C 2201/18* (2013.01); *C02F 2201/48* (2013.01)

(58) Field of Classification Search
  CPC .... B01D 29/908; B01D 35/12; B01D 35/143; B01D 21/0009; B01D 21/0012; B01D 21/2411; B01D 21/2483; B01D 29/114; B01D 29/117; B03C 1/0332; B03C 1/288; B03C 2201/18; B03C 1/30; C02F 1/001; C02F 2201/48
  See application file for complete search history.

(56) References Cited

FOREIGN PATENT DOCUMENTS

| | | | | |
|---|---|---|---|---|
| EP | 441367 B1 | * | 1/1996 | |
| EP | 2829811 A1 | | 1/2015 | |
| GB | 2491361 A | * | 12/2012 | ............... B03C 1/30 |
| WO | 0027499 A1 | | 5/2000 | |

OTHER PUBLICATIONS

Second Written Opinion of the International Preliminary Examining Authority for the International Patent Application No. PCT/NL2017/050496, dated Jul. 19, 2018, 7 pages.

International Preliminary Report on Patentability for the International Patent Application No. PCT/NL2017/050496, dated Nov. 29, 2018, 9 pages.

\* cited by examiner

LIQUID TREATMENT DEVICE

The present disclosure relates to a liquid treatment device, configured to perform at least one treatment from a group of at least two different treatments. For example the device may be deployed to perform—at any given time—one of: filtering of liquid from a heating or cooling system; attracting magnetically susceptible particles from such liquid; introducing additives into the liquid; replenishing the liquid; et cetera.

The inventor's own MB3 product constitutes prior art, and comprises a package of a number of strong magnets, as described in for instance WO-2013/077729. In a plastic magnet holder two magnets are positioned in opposite of each other. The MB3 is a separator, able to separate high percentages of magnetite out of the system water. However, other dirt particles, debris and the like (other than iron based, or at least not magnetically susceptible) are separated less efficiently. Separating non-magnetic debris is a problem for most separators, in particular dirt separators. Once dirt, debris and/or other particulate matter, both magnetic and non-magnetic, is separated, it can be removed in an easy way, but not without system interruption for access to the interior of the housing for cleaning.

Heating and cooling systems have become more sensitive to dirt, debris, welding residues and the like, because energy efficient pumps, electronically-controlled radiator valves and the like are more and more vulnerable to damage caused by such dirt, debris and the like. Consequently there's a growing desire for an easy operable separator. It is very important that an installation starts with clean water from the beginning. In case the separator is installed in a heating or cooling system with a lot of debris, welding residues and the like, it is important to filter the system water thoroughly right from the beginning. A filter, however, exhibits a major pressure drop, and it can block, when packed or get clogged with dirt, debris and/or residues.

Reference is further made here to disclosures in for instance US-2016/018144 and WO-2013/041245. Also, reference is made here to US-2009/045104, which discloses a metallic particle separating machine, and is considered to constitute the closest prior art in relation to the present disclosure. This known separating machine has a housing with an inlet, an outlet, a first flow path that extends between the inlet and the outlet, and a second flow path that also extends between inlet and the outlet. The first and second flow paths through the housing are separate and distinct from one another. The metallic particle separating machine includes a first array of magnetic bars to extend in the housing in the first flow path, and a second array of magnetic bars to extend in the second flow path. A diverter valve adjacent the inlet serves for directing material that enters the inlet through either the first flow path or the second flow path, and subject the material to one type of treatment— separation of magnetically susceptible particles—in both flow paths. When the first flow paths is in operation, the magnetic bars in the second flow path are made accessible for cleaning, and vice versa. This known separating machine is therefore dedicated to separation of metallic or magnetically susceptible particles, and has no other function or type of treatment, thus exhibiting low versatility. In fact two parallel and identical treatments are preformed in the first and second flow paths, to enable cleaning of the magnet bars of one flow path, when the other flow path is in operation, whereby effectively the operation in any one of the two flow paths is interrupted for cleaning. Non-metallic particles are left in the liquid. Cleaning the magnet bars itself is cumbersome, as the magnet bars need to be removed from the first and second flow paths, when inoperative, which is time consuming and meticulous labour. Moreover, repeated removal of the magnet bars may result in reduced reliability of seals at entrances where the magnet bars are inserted into and retracted from the housing of the known separating machine, for which a solution is sought whereby having to access the interior of the housing may be avoided. In fact, a separating machine according to US-2009/045104 is excessively costly, requiring valves, and duplicate magnets, in that in parallel the identical same treatment is provided twice, to allow for cleaning during down-time of one, without contribution to versatility or ease of use.

Meanwhile, there are more concepts on the market, for multiple types of treatment performed using a single device. However, to change from one operation mode or treatment type to another, all these prior art disclosures require opening of the device, interrupting the heating or cooling process, cumbersome adjustments and sensitive re-assembly.

In contrast, the device according to the present disclosure exhibits the features of the appended independent claim. Thereby the device can be operated from the outside in a robust and reliable manner, to adapt the device from operating in one of the treatments and have it operate thereafter in another one of the treatments.

Preferred embodiments are defined in the appended dependent claims and/or will be described below in the embodiment description. It should be self evident that features in the dependent claims and/or in the embodiment description are not limiting on the scope of protection as defined in the single independent claim. Even for the features in the independent claim alternatives may be developed in the future, and obvious alternatives, also form the dependent claims, are intended to be encompassed in the scope of protection for the present disclosure.

In the appended drawings, preferred embodiments are shown, which are described herein below, wherein the same or similar elements, components and/or aspects may be designated using the same reference signs, and wherein.

Figure 11:
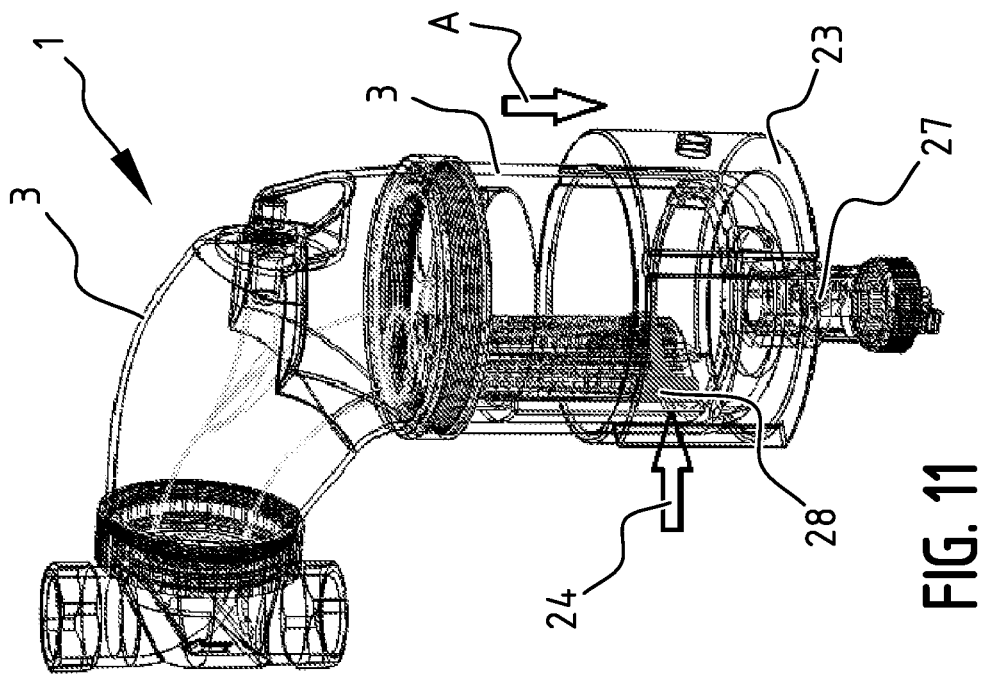
Figure 10:
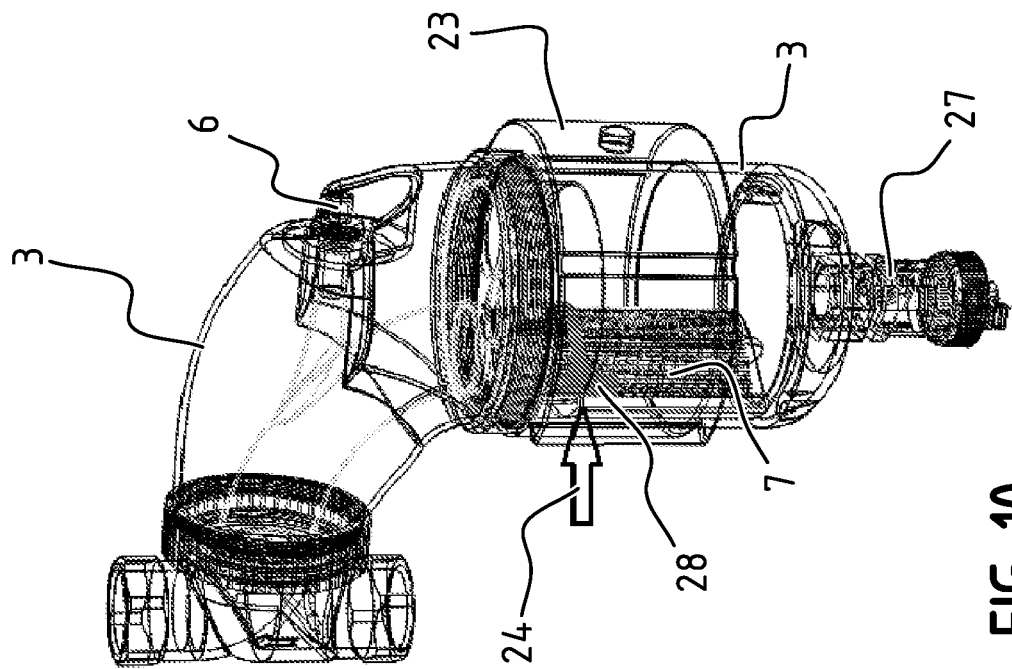
Figure 13:
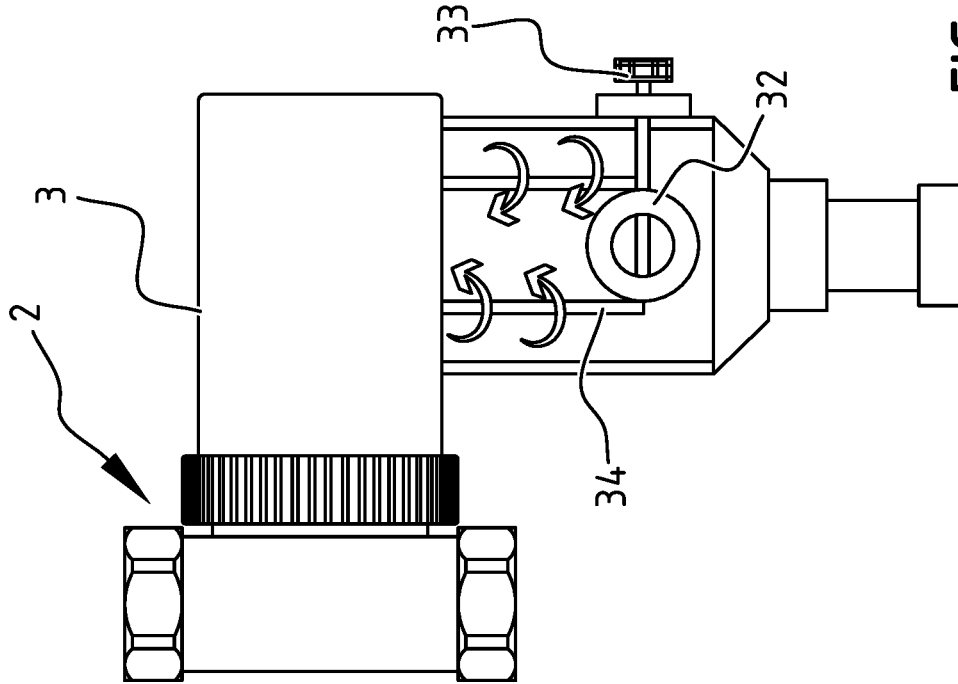
Figure 12:
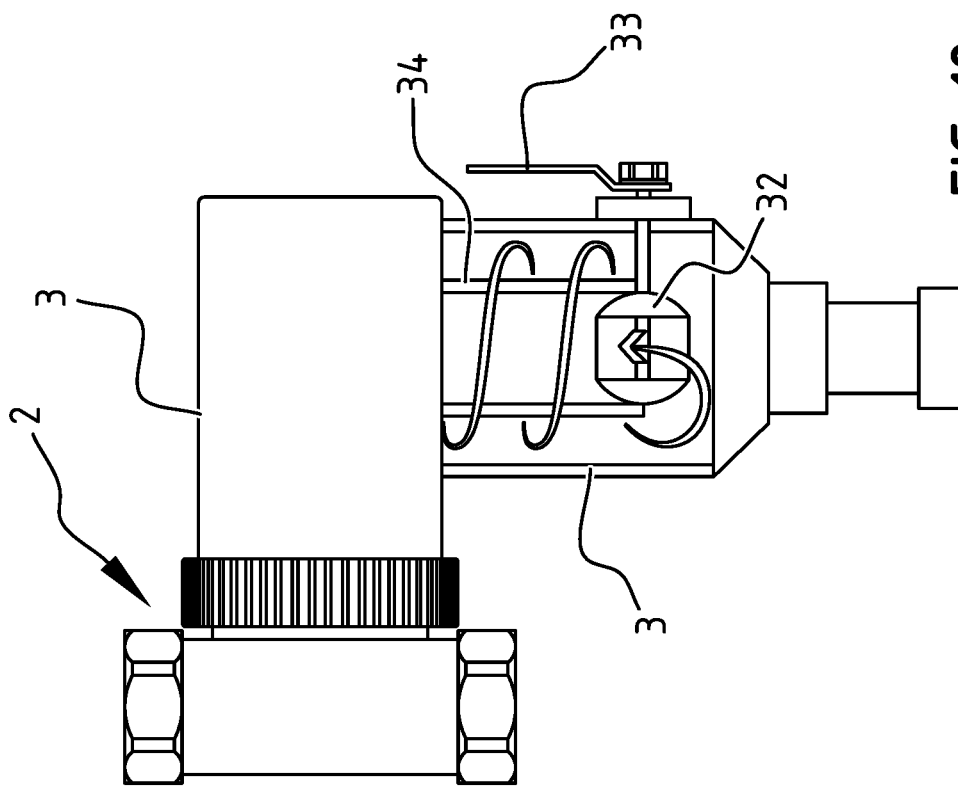

FIGS. 10, 11 exemplify a scraper associated with a filter in a particular embodiment of the liquid treatment device according to the present disclosure;

FIGS. 12, 13 exemplify an embodiment wherein a filter is stationary; and

Figure 15:
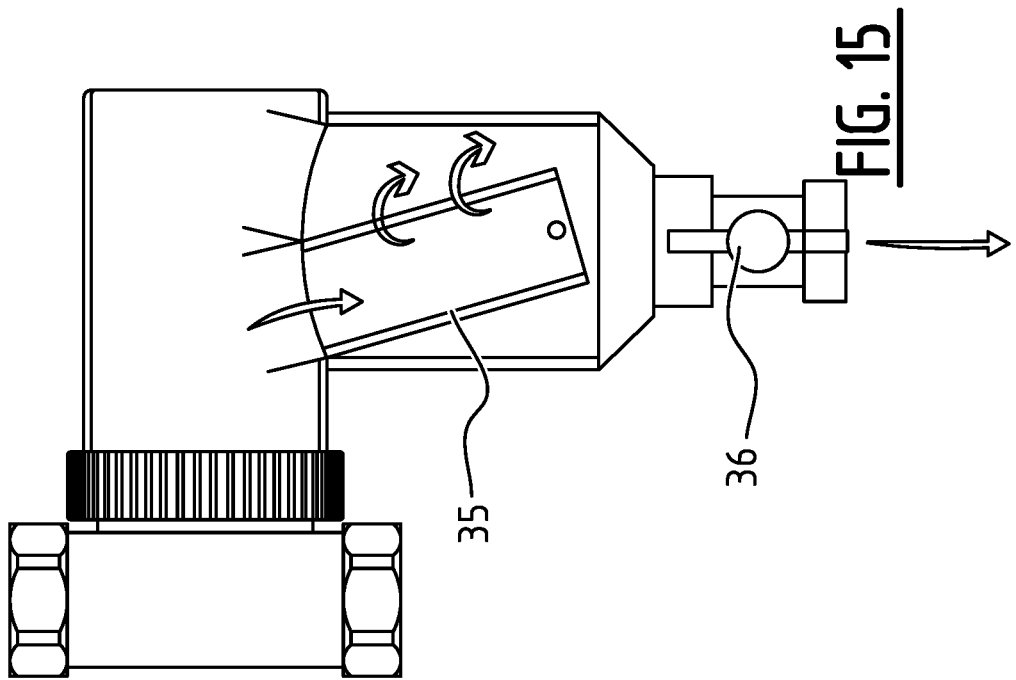
Figure 14:
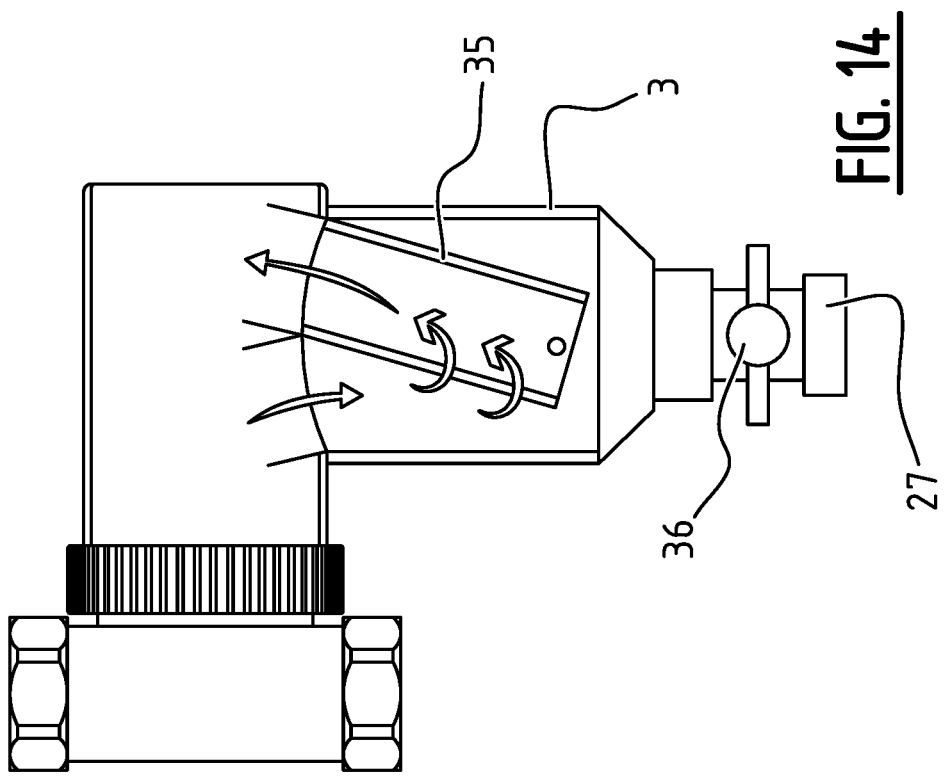

FIGS. 14, 15 exemplify an embodiment with a swivel filter.

Figure 1:
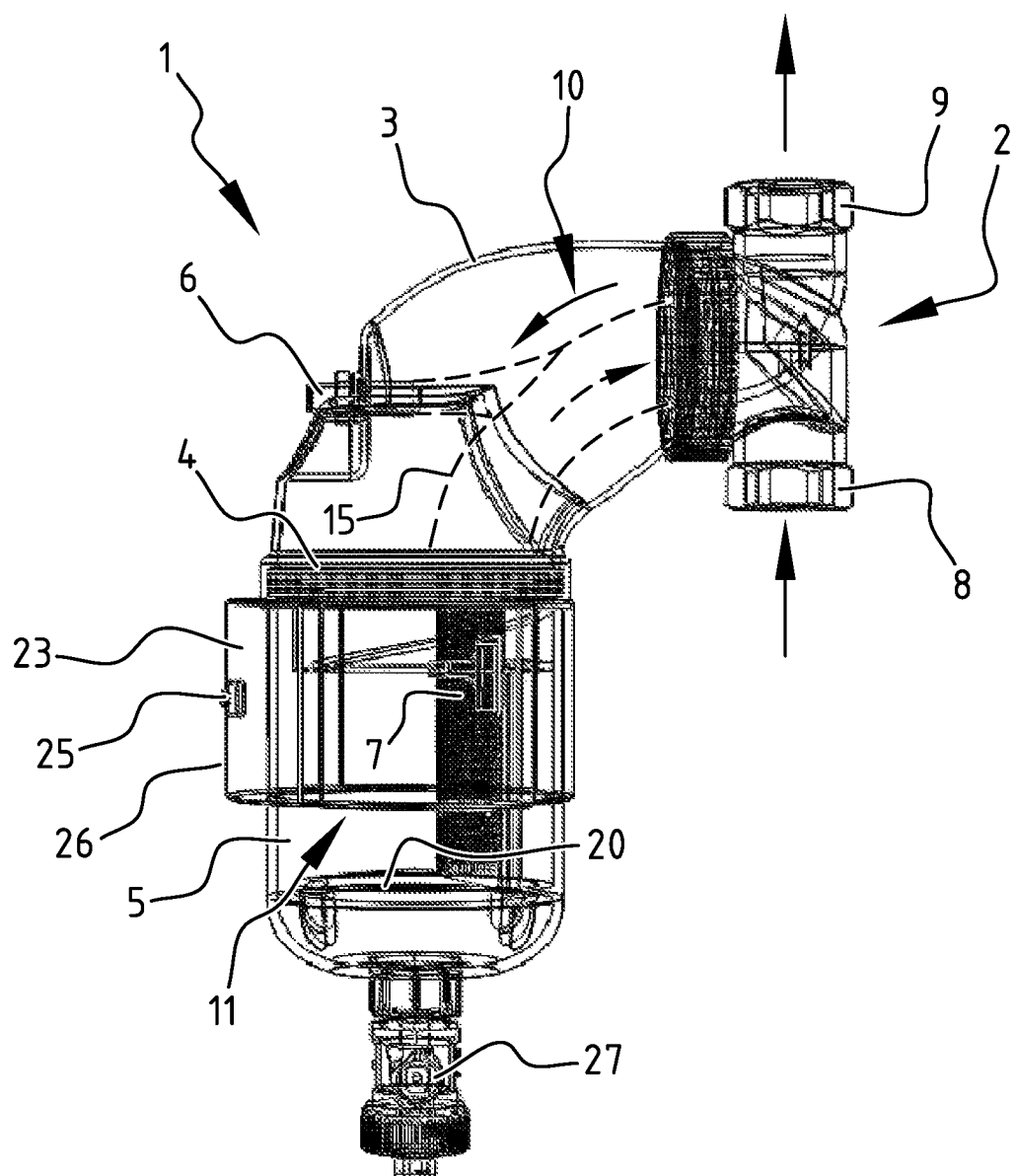
FIG. 1 shows a schematic representation of a liquid treatment device according to the present disclosure.

The device 1 in FIG. 1 comprises a housing 3 which can be incorporated in a circuit (not shown) via a connector 2, comprising an input connector 8 and an output connector 9. The reference to input and output is relative to the device 1 (not the circuit).

Housing 1 accommodates a manifold 10 and an adapter 11.

The manifold 10 comprises a stationary apertured disk 4 with a circumferential quarter-circular indented edge portion 12. The disk 4 comprises two circular passages 13, 14, of which passage 14 is connected to output connector 9 via tube 15. A dosing tube 6—herein below also referred to as a dosing point—is connected to the tube 15 for introducing (chemical) additives into the circuit or even, if desired, replenishing the circuit. Additives may be used to avoid or decrease corrosion, anti-bacterial additives, and the like, to control or improve the water quality of a heating or cooling system. The dosing tube extends through the housing 3 and consequently contributes to maintaining the manifold stationary. For fixing the manifold, no additional fixation needs to be provided, although additional fixing is not excluded from the scope of the present disclosure.

Passage of liquid through manifold 10 is therefore through more than one, or through one or none of the passage 14 and the circumferential indented edge portion 12, depending on a position of adapter 11 underneath the disk 4, described below in more detail.

Figure 2:
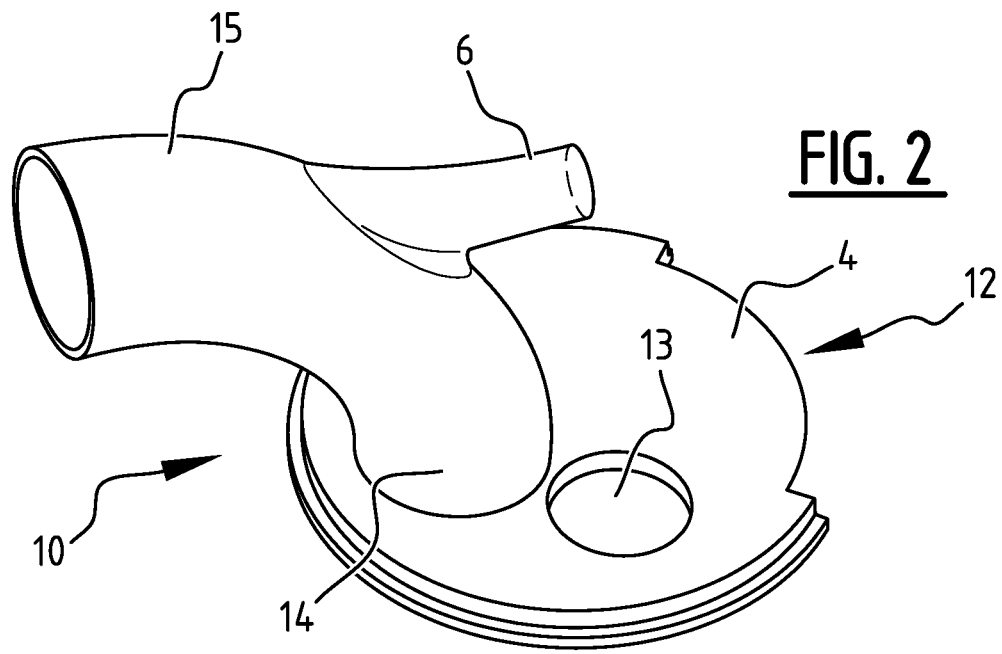
FIGS. 2 and 3 show respective perspective views of a manifold of the device of FIG. 1.
Figure 3:
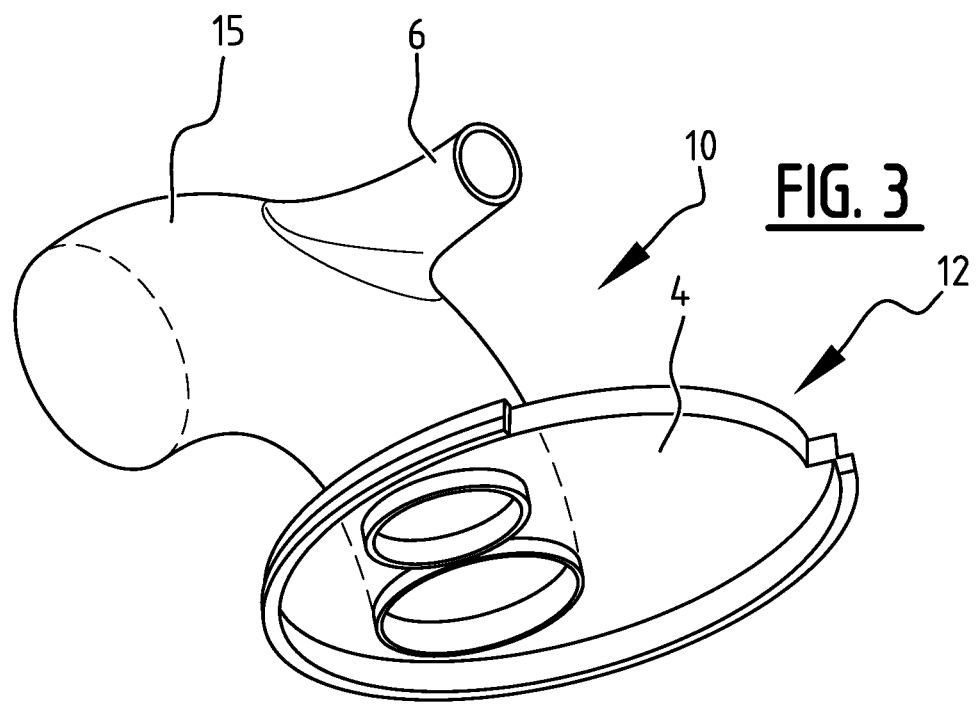

The disk 4 can comprise, in an alternative embodiment, more passages 13 and/or indentations 12, potentially of different dimensions than in the schematic representation of FIGS. 2 and 3, depending on a desired functionality in conjunction with positions of the adapter 11.

Adapter 11 is essentially cylindrical and rotatable around its longitudinal axis in housing 3 and comprises a top plate element 16, which in an assembled state abuts closely against the apertured disk 4 and comprises three passages 17-19 and a circumferential semi-circular indented edge portion 21, from which a tangential flow inducing helical ledge 22 extends. A filter 7 extends between top plate element 16 and en end plate 20, to close an inner space off by extending along passage 19, from inner wall to inner wall of housing 3.

Figure 4:
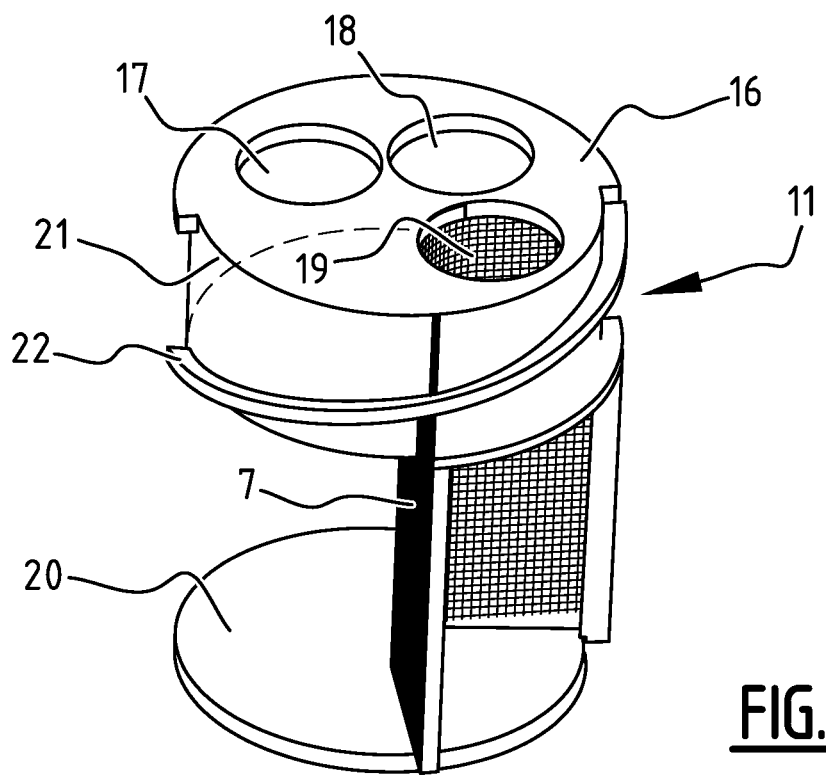
FIGS. 4 and 5 show respective perspective views of an adapter of the device of FIG. 1.
Figure 5:
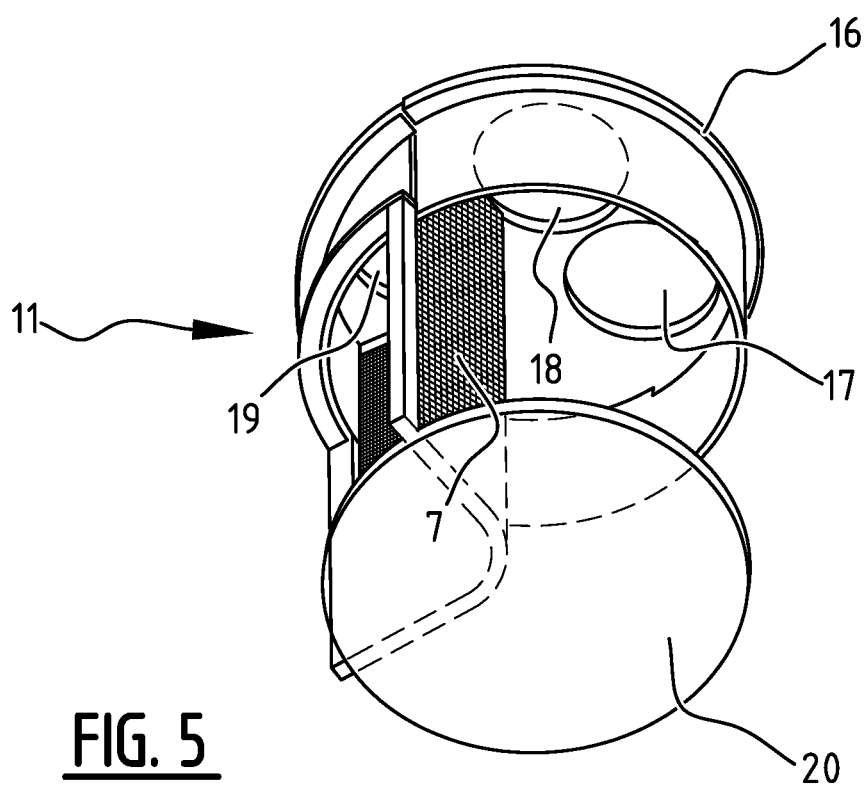

The top plate element 16 can comprise, in an alternative embodiment, more passages 17-19 and/or indentations 21, potentially of different dimensions than in the schematic representation of FIGS. 4 and 5, depending on a desired functionality in conjunction with positions of the adapter manifold 10.

The combination of top plate element 16 and disk 4 on the one hand and end plate 20 on the other define there between a treatment space 5. Below end plate 20 is FIG. 1, there's a quiet zone, with decreased turbulence, to allow debris and magnetite to float down towards a flushing valve 27.

The adapter 11 is rotatable from outside of housing 3. To this end, conveniently a magnet pack 23 can be employed. Adapter 11 may be made (not shown) from plastic with metal strips (iron e.g.) therein, to enable magnetic attraction. Magnet packs for removal of magnetically susceptible particles are known in the field. In this case the magnet pack 23 can be rotated, for rotation of the adapter 11. Other means to achieve rotation of the adapter 11 are conceivable within the knowledge and possibilities of the normally skilled reader.

Likewise the different functionalities may alternative be achieved using a translatory movement of an alternative adapter (not shown). Below a further embodiment based on a stationary filter is discussed in relation to FIGS. 12 and 13.

The magnet pack 23 comprises a dirt indicator 25 in the magnet holder 26. Based on determined variations in the fields generated by the magnets, and influenced by dirt and/or debris, especially magnetite, it's possible to determine that the filter may need to be cleaned or scraped, or that flushing valve 27 needs to be activated to allow debris, magnetite and the like to be discharged from the device via the selectively operable valve. An automatic control may be provided (not shown) to operate valve 27, when the indicator generates a signal that the device needs cleaning. More in particular, the discharge valve 27 may be or comprise a drain ball valve.

The magnet pack 23 can also be moved axially, as is shown in FIGS. 10, 11. A scraper 24 is movably arranged on filter 7, to be dragged down in the direction of arrow A in FIG. 7, based on magnetic attraction from the magnet pack 23. The scraper 24 may be made of plastic, comprising metal (iron e.g.) strips, preferably incorporated in the plastic (block shape 28 at the ends of the scraper 24). Consequently, the scraper 24 is made to move with the magnet ring, simultaneously cleaning the filter potentially during purging, e.g. when valve 27 is flushed.

Several types of dirt indicators may be employed to indicate filter clogging. In a first embodiment, an dirt indicator may respond to the decreasing magnetic force field, due to a large influx of magnetite. The indicator can consist of a metal plate, held into position against the magnetic field by a light spring. When the magnetic force decreases, by magnetite on the inside of the unit, the spring pushes the metal plate outwards. Alternatively, a conventional so-called reed contact may be employed in much the same manner as described above, where the reed contact responds to changes in the magnetic field force. When this field force decreases (growth of magnetite), the reed contact can be connected to an external signal. This can be a controller of the heating or cooling system, or a building management systems or, if connected to media resources, it can be used to send messages (email, sms, etc.).

As shown in FIGS. 6-9, by turning the adapter 11 using the magnet pack 23, passages of the manifold 10 and of the top plate element 6 are opened or closed. Water entering the device, flows from the swivel connector 2 into the upper section, around the bent tube 15, where it passes through aligned openings—if any. Water can only leave the device via the bent tube 15 of the manifold 10 in the upper section, that ends up into the swivel connector 2, if one of the passages 17-19 in the underlying adapter 11 is aligned with the tube 15. The smaller end on the bent tube is connected to the dosing tube 6 or nipple. By this dosing tube 6 or nipple the manifold is fixed in the upper section (together with the passing of the disc in the upper section).

The schematic representations of FIGS. 6-9 show different alignments of the manifold 10 and of the rotatable inner adapter 11, which is located in the lower section, relative to one another.

In this exemplary embodiment four positions are shown. It is also possible to have only two or three positions (enabling a selection or enabling a single one of several functions, such as filtering, separation and dosing).

In an embodiment where the device 1 is incorporated into a heating or cooling system, water may enter the bent tube 15 to flow back to the heating or cooling system after having passed through filter 7, for which two ordinary openings (small or larger) of the adapter 11 can be selected. In a position of the adapter 11, blocking the bent return tube, it may be possible to open the valve 27 and flush the filter, such that filter 7 can be cleaned.

The disc 20 at the lower side of this inner rotatable adapter 11 is smaller than the housing 1 to create a circumferential gap, to provide a non-turbulent or quiet zone, and to be enable collection therein of debris, magnetically susceptible particles, welding residues, and the like. Around the cylindrical part at a higher portion of the adapter 11 a ledge 22 is provided rushing away downward, in order to generate a tangential flow in the treatment space.

In a filter mode (FIG. 6), the adapter 11 is positioned to make all inbound water incoming through aligned passage 29 pass through filter 7, and back to the system via aligned passage 30. Particles larger than the filter's mesh will be blocked by the filter 7, and smaller magnetite particles are caught by the magnet pack 23.

Figure 7:
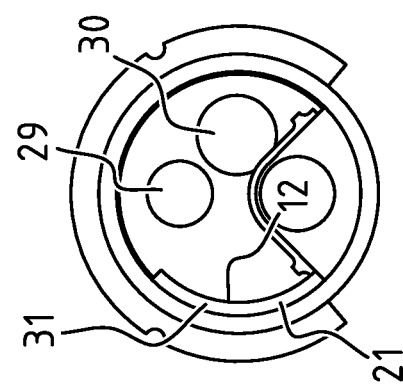
Figure 6:
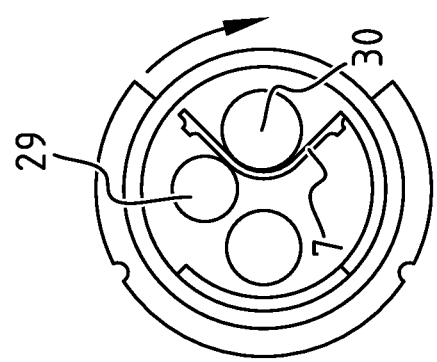

When the adapter 11 is rotated from the position in FIG. 6 to the position in FIG. 7, then a light separation mode is set. Therein, an additional passage 31 is aligned at indented edge portions of the aperture disk 4 and the indented edge 21 of top plate element 16. In passage 31, liquid flow with a tangential component is generated, where openings are maximal and pressure drop is minimal. Debris is caught by the magnet pack 23 and in the quite zone under cover shield or disk 20.

Figure 8:
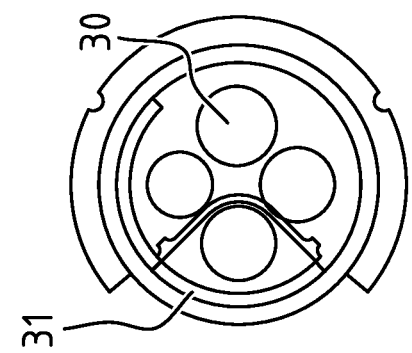

When rotating the adapter 11 further, to position the adapter 11 as is shown in FIG. 8, aligned passage 29 is closed and only passages 31 and 30 remain open, to set a heavy separation mode. The tangential component of the inbound flow of liquid is strengthened thereby, as the axial component through aligned passage 29 is closed off.

Figure 9:
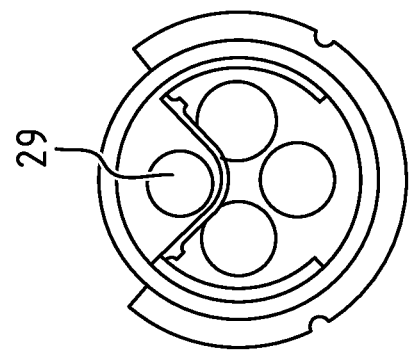
FIGS. 6-9 show operational states, in the depicted embodiment: rotational states, of the adapter relative to the manifold.

Finally, in FIG. 9, the outbound flow through aligned passage 30 is closed and only inbound flow through aligned passage is open. This enables optimal introduction of additives into the system through dosing tube or nipple 6, and thereby additives are prevented from sinking down and remaining in the lower part of the separator, e.g. under the cover shield or disk 20.

FIGS. 12 and 13 exhibit another exemplary embodiment, in which an entry of a cylindrical filer 34 in housing 3 is selectively opened (FIG. 12) or closed (FIG. 13) using a valve 32, operated by an outside control handle. In FIG. 12 is a separation mode with the filter entry open, and FIG. 13 shows a filtration mode.

FIGS. 14 and 15 exhibit another embodiment with a pivotable filter 35, where filter 35 is swiveled between a filtering position in FIG. 14 and a flushing position in FIG. 15, where filter 35 is actuated in a swivel motion by valve knob 36.

Additionally or alternatively, in relation to FIGS. 6-9 dosing in the form of introducing additives into the circuit is described as separate from flushing. However, in a flushing mode, employing a reversal of the flow direction, flushing may also may be implemented in the dosing mode of FIG. 9.

Although above, specific embodiments of the present disclosure have been described in detail, no features, elements, components or aspects thereof are limiting on the present disclosure, and even obvious alternatives for features in independent claims may in some jurisdictions be encompassed by the scope of the present disclosure.

Consequently, future and as yet unforeseeable embodiments may as well be encompassed in so far as therein the nature of the present disclosure is discernible.

The invention claimed is:

1. A liquid treatment device, configured to perform at least one filter operation from a group of at least two different types of filter operations, the device comprising:
a first filter comprising a mesh filter for filtering of particles from a liquid in a heating or cooling system; and
a second filter comprising a magnet assembly for defining a magnetic filter of which the magnet assembly is configured to trap magnetically susceptible particles in a treatment space, thereby removing said magnetically susceptible particles from such liquid,
the device further comprising:
a connector defining a tubular input conduit and a tubular output conduit;
a housing defining a closed-off space comprising the treatment space, wherein the magnet assembly is arranged on an outside of the housing; and
an adapter inside the housing comprising a top plate element with a plurality of passages, wherein the adapter is rotary or translatory moveable in the housing between at least:
a first position corresponding with a filter mode, wherein a first passage of the top plate element of the adapter is aligned with the tubular input conduit to make all inbound water pass through the first filter, so that particles larger than the first filter's mesh will be blocked by the first filter, and smaller magnetite particles are caught by the magnet assembly of the second filter; and
a second position corresponding with a light separation mode, a second passage of the top plate element of the adapter is aligned with the tubular input conduit to make all inbound water bypass the first filter and smaller magnetically susceptible particles are caught by the second filter; and
wherein the device further comprises:
a control outside the housing and connected to the adapter, the control configured to set the adapter from outside of the housing into one of at least the first position and the second position.

2. The liquid treatment device of claim 1, wherein the device further comprises a dosing point and the adapter is moveable to a third position, wherein an outbound flow through a passage aligned with the tubular output conduit is closed and only inbound flow through a passage aligned with the tubular input conduit is open to enable introduction of additives through the dosing point.

3. The liquid treatment device of claim 1, wherein the adapter is moveable to an additional position corresponding with a heavy separation mode, wherein all inbound liquid passes through the first filter and smaller magnetically susceptible particles are caught by the second filter, and a tangential component of and inbound flow of liquid is strengthened relative to the filter mode.

4. The liquid treatment device of claim 1, wherein the tubular input conduit and the tubular output conduit extend into the space in the housing and the adapter comprises a divider in the housing between the tubular input conduit and the tubular output conduit on the one hand and the treatment space on the other hand.

5. The liquid treatment device of claim 1, wherein the adapter comprises at least two passages.

6. The liquid treatment device of claim 5, wherein the first filter is associated with at least one of the passages.

7. The liquid treatment device of claim 1, further comprising a scraper associated with the first filter.

8. The liquid treatment device of claim 7, further comprising an actuator operable from outside of the housing for moving the scraper relative to the first filter.

9. The liquid treatment device of claim 1, wherein the adapter comprises a disk which is rotatable in the housing.

10. The liquid treatment device of claim 9, wherein the first filter extends from the disk to divide the treatment space in two portions to filter inflowing liquid.

11. The liquid treatment device of claim 1, wherein the output conduit comprises a dosing input connection which branches from the output conduit and extends through the housing whereby the dosing input connection is accessible from outside of the housing.

12. The liquid treatment device of claim 11, wherein the control comprises a valve and is configured to close the output conduit from the treatment space.

13. The liquid treatment device of claim 1, wherein the magnet assembly is moveable along an outer surface of the housing.

14. The liquid treatment device of claim 13, further comprising a scraper associated with the first filter comprising an actuator, wherein the scraper comprises a magnetically susceptible material and the moveable magnet assembly forms the scraper's actuator.

15. The liquid treatment device of claim 1, further comprising a discharge valve which is operable to be selectively opened to expel at least one of dirt, debris, and magnetically susceptible material from the treatment space.

16. The liquid treatment device of claim 15, wherein the magnet assembly is moveable to displace magnetically susceptible material towards the discharge valve.

17. The liquid treatment device of claim 1, further comprising a filter clogging indicator.

18. The liquid treatment device of claim 17, wherein the filter clogging indicator comprises a magnetic field detector which is configured to detect changes in the magnetic field of the magnet assembly indicative of filter clogging.

19. The liquid treatment device of claim 18, wherein the magnetic field detector comprises a magnetite sensitive configuration comprising a metal plate held into position against the magnetic field by a spring, wherein when the magnetic force of the magnet assembly decreases due to magnetite on the inside of the unit, the spring is configured to push the metal plate outwards.

20. The liquid treatment device of claim 18, wherein the magnetic field detector comprises a reed contact, wherein the reed contact is responsive to changes in the magnetic field force from the magnet assembly due to filter clogging.

* * * * *